March 31, 1964  H. L. CARPENTER ETAL  3,126,797
PLASTIC LINED FIBER CONTAINERS Filed Aug. 30, 1961  5 Sheets-Sheet 1

INVENTORS
HERBERT L. CARPENTER,
HERBERT L. CARPENTER, JR.
BY Kane, Dalsimer and Kane

ATTORNEYS

March 31, 1964   H. L. CARPENTER ETAL   3,126,797
PLASTIC LINED FIBER CONTAINERS Filed Aug. 30, 1961   5 Sheets-Sheet 3

INVENTOR.
HERBERT L. CARPENTER,
HERBERT L. CARPENTER, JR.
BY Kane, Dalsimer and Kane

ATTORNEYS

INVENTORS
HERBERT L. CARPENTER,
HERBERT L. CARPENTER, JR.
BY Kane, Dalsimer and Kane

ATTORNEYS

3,126,797
PLASTIC LINED FIBER CONTAINERS
Herbert L. Carpenter, Amityville, and Herbert L. Carpenter, Jr., Lindenhurst, N.Y., assignors to The Greif Bros. Cooperage Corporation, Delaware, Ohio, a corporation of Delaware
Filed Aug. 30, 1961, Ser. No. 134,953
9 Claims. (Cl. 93—36.01)

This invention relates to plastic lined containers, and more particularly to plastic lined fiber containers as well as their method of manufacture whereby liquids and semi-liquids are most effectively stored and shipped therein.

The recent trend in shipping and storing practices for bulk material, of liquid or semi-liquid nature, is to utilize plastic lined fiber drums. Drums of this type are desirable because they are inexpensive and lightweight. The outer shell of the drum is usually constructed of lightweight material such as laminated layers of fibrous material, whereas the inner liner is generally impervious and as such prevents leakage, and/or contamination of the drum contents. The contemplated drums range in size up to 55 gallons or more in capacity and must withstand rough handling in transit by being sturdily constructed and of sufficient structural strength to withstand ordinary use and abuse. Quite naturally, under such circumstances, leakage or contamination of the drum contents through the otherwise impervious liner must be avoided.

It has been found that plastic liners are extremely suitable because of their numerous inherent advantages and characteristics. Among these being flexibility, imperviousness, chemical inertness and tensile strength, as well as others. However, liners now in use are commonly formed with a longitudinal seam; the result of overlapping marginal side-edges of the liner, and a seam created at the juncture of a disc-type base and the side walls of the liner. The presence of these seams produce points of weaknesses at which the liner ordinarily breaks or tears if it is to fail thereby creating a tendency for the liner to become previous at the point of rupture.

An important object of our present invention is to correct the disadvantages of prior art lined drums by eliminating such joints and at the same time provide satisfactory means for inspecting the bottom and top of plastic liner as well as its side walls prior to closing the top and bottom of the drum.

Another important object is to provide a plastic lined fiber drum capable of withstanding ordinary use and abuse during shipping and storage of liquid and semi-liquid bulk materials by blowing a semi-molten plastic parison into engagement with a fiber shell such that there is an opportunity to examine the intended bottom and top of the liner, together with the liner side walls, prior to closing the bottom and top of the drum.

Other objects include provisions for a blown plastic lined fiber drum which meets the standards and specifications of the various rules and regulations governing the shipment of liquids and semi-liquid materials in fiber drums, as for example, the standards established by the "Uniform Freight Classification 5"; is liquid tight and impervious to contaminating surroundings; is substantially leak-proof, with little or no danger of rupture of the hermetic seal thus provided by the liner, particularly at the bottom chime because of integral one-piece liner construction; is manufactured by employing the fiber shell itself as part of the die cavity; has present a coalescence of the liner material with the fibers of the outer shell to provide a unitary construction; may incorporate one of a number of various top closures depending upon conditions and requirements; and has substantially no weak spots such as crimps, bends and punctures such as that common to prior art plastic lined drums in which the liners were ordinarily supplied from a separate source other than the drum manufacturer thereby increasing the tendency for such failures as a result of packaging and transporting such pre-formed liners to the various manufacturing and assembly sites.

In accordance with the present invention, plastic lined drums are manufactured by initially providing a tubular shell made from laminated layers of fibrous material, open at both of its ends. In accordance with a specific embodiment, reinforcing metal chime strips are exteriorly mounted at both ends of the shell and as is usual practice, external grooves and internal shoulders are then formed at both ends extending completely around the circumference of the shell, a short distance from the respective peripheral edges. The resultant composite shell structure is then placed in an open press. A plastic parison is then extruded into the interior of the mounted shell so that the terminal end of the parison extends a short distance beyond the bottom of the shell. The press is then closed in such a manner that the exterior side walls of the shells are adequately confined. Upper faces of the press are actuated at approximately the same time as the lower die faces to close the top of the selected length of parison while retaining an air inlet opening through which an air nozzle may be inserted to communicate with the interior of a length of parison. At such time, the lower end of the parison is pinched or clipped and substantially simultaneously therewith the pinching faces of the press are shifted upwardly to locate the base of the retained parison in substantial alignment with the crest of the internal shoulder formed in the lower end of the shell. Air is immediately introduced through the nozzle into the interior of the now sealed parison to blow the parison outwardly and expend it into engagement with the interior walls of the shell, and against the upper and lower die faces. Air evacuation means may provide access for the air confined between the exterior of the parison and shell and internal press faces to prevent any irregularities in the ultimately blown liner. Suitable cooling means in the dies permit immediate setting of the blown plastic liner so that the shell, with its liner, can be removed from the press within a minimum period of time. The top and base of the liner may now be examined for undesirable weak spots, pin holes or other potential points of rupture. If a sufficiently sound top and base of the liner is found, which is usually the case when practicing our invention, the selected top and bottom closures for the lined fiber drum are fabricated in accordance with the usual techniques employed in the trade. With respect to the drum top, it will become evident that one of a number of closures can be utilized depending upon the intended application of the finished drum.

Other objects and advantages become more apparent from the detailed description of the invention which is to be taken in conjunction with the drawings showing a somewhat preferred embodiment thereof and in which.

Figure 1:
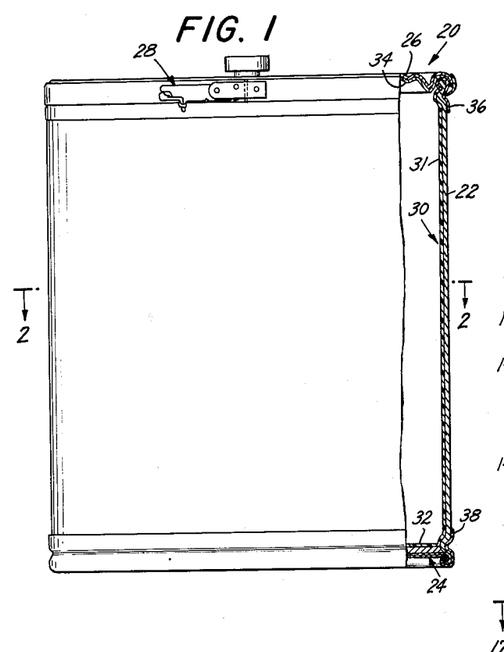
FIG. 1 is an elevational view with certain parts broken away and removed of a plastic lined fiber drum fabricated in accordance with the present invention and having a cover secured in place by means of a locking rim assembly, and a central filler and emptying aperture and cap therefor.
Figure 2:
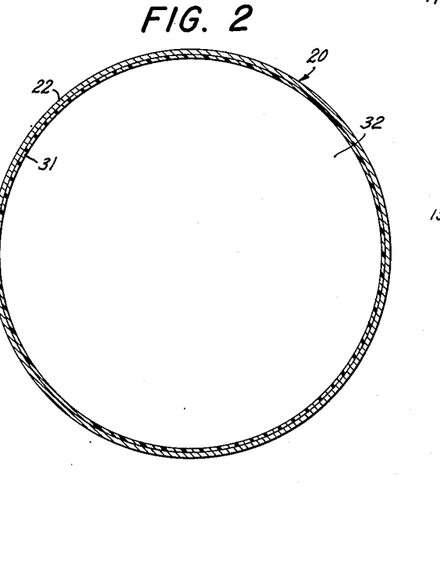
FIG. 2 is a cross-sectional view of the drum taken along the line 2—2 of FIG. 1.

In the accompanying drawings, with particular reference to FIGS. 1 and 2, we have shown a fiber drum 20, fabricated in accordance with the present invention, having a tubular shell 22 which may be of any cross-sectional shape and which is preferably made from convolutely wound laminated layers of fibrous material such as kraft board, fiber board or the like. The fiber shell 22 is usually made by winding a sheet of kraft board around a mandrel with suitable adhesives coating the surfaces of the board and permeating the pores and fibers thereof.

The bottom end of the shell 22 is provided with a permanently attached closure 24 and the upper end with a removable cover 26 constituting one of a number of upper closures that may be incorporated along with our drum. The illustrated cover may be of the conventional steel variety which is ordinarily releasably locked in place by means of a locking rim assembly 28 which may be of the type disclosed in our commonly assigned United States Patent No. 2,884,176 granted April 28, 1959, and United States Patent No. 2,966,378 granted December 27, 1960.

The interior of the shell 22 is lined with a blown plastic liner 30 having corresponding side walls 31 extending into an integral base 32 resting on the bottom closure 24. Thus, it should be abundantly clear that the liner does not contain a joint and consequently a zone of weakness adjacent the bottom of the drum. In order to complete the seal for the interior of the drum in accordance with the illustrated embodiment, the cover 26 may be provided with a pre-formed cover seal 34 also fabricated from a suitable resinous material. As illustrated, a centrally located, filling and emptying screw fitting and cap projects from the closure.

The end portions of the drum 20 may be strengthened in the usual manner by providing upper and lower metal reinforcing chimes 36 and 38 around both the upper and lower ends respectively of the shell 22.

The liner 31 is preferably blown from extruded thermoplastic material having the desired characteristic governed by the intended use of the finished drum 20 and the nature of the liquid or semi-liquid substance to be contained therein. Among the numerous advantageous characteristics of the liner 31 that will be considered in this regard will be substantial imperviousness, chemical inertness, tensile strength, non-toxicity and other detrimental effects on contained substances which may include chemicals, combustibles, comestibles or food products. These thermoplastic materials may include polyethylene, polypropylene, nylon and the like, to mention a few.

Figure 3:
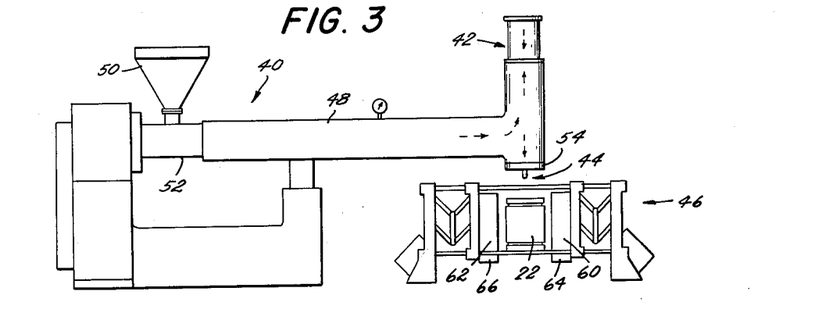
FIG. 3 is a schematic diagrammatic view of an extruder having at its discharge end an accumulator and nozzle from which a plastic parison is discharged into the drum to be lined which is suitably mounted in a press.

In FIG. 3 we have illustrated, rather schematically, apparatus by which a suitable length of the selected thermoplastic material, extruded in tubular form, may be blown into corresponding engagement with the contours of the shell 22. This apparatus includes an extruder 40 having a built-in accumulator 42, separately tapped or built-in blowing equipment 44 and a press 46.

The extruder 40 includes an extruding screw (not shown) within the tubular housing 48. A hopper 50 conveniently receives the thermoplastic material either in granular or pellet form and is adapted to transfer this material into the melter 52 at the inner end of the tube 48. This hot melt material will then be placed in condition for transmission to the other terminal or free end of the tube by the extrusion screw contained therein. In order to speed up the operation of the lining of the fiber shell 22 and maintain the extruder continuously operating, an accumulator 42 is mounted at the terminal end of the tube 48 and is adapted to store the molten material transmitted by the extrusion screw. Although an accumulator is not necessary it lends itself to more efficient extrusion by decreasing extrusion time for a length of parison, approximately ten-fold and even higher, depending on the parameters of the apparatus.

The lower end of the accumulator 42 includes a ring nozzle 54 of the adjustable type. This nozzle forms the tubular parison 56 as the molten thermoplastic material is discharged therethrough from the accumulator. The adjustment of the ring nozzle 54 takes into consideration two factors, namely, the diameter of the parison 56 as well as its thickness. The extruded parison is continuously formed and discharged downwardly by means of the ring nozzle 54. A double platen hydraulic press 46 is disposed beneath the nozzle 54, and when in an open condition, permits free passage therethrough the parison 56. As will be more fully explored shortly, upon closure of the press 46, a predetermined length of the parison 56 will be severed from that discharged through the nozzle 54 to form the blank ultimately blown into engagement with the side walls of the fiber shell 22 to provide the desired liner.

We have found that a successful commercial application of our invention includes a Luigi Bandera extruder with built-in accumulator, manufactured by the Meccaniche Luigi Bandera firm of Italy and distributed in the United States by The Rainville Company, Inc., Garden City, New York; blowing equipment manufactured by the Blow-O-Matic Corp. Ltd., whose sales agent is Danish Plastic, Copenhagen, Denmark; and a double hydraulic platen press sold under the name of Raince Molder distributed by the Rainville Company, Inc., Garden City, New York.

Although the blowing equipment 44 is shown herein associated with the discharge end of the accumulator 42, it should be understood that this equipment may be located at the base of the press 46 so as to introduce air into the parison 56 through the bottom end thereof as is frequently done in commercial blowing operations.

Figure 4:
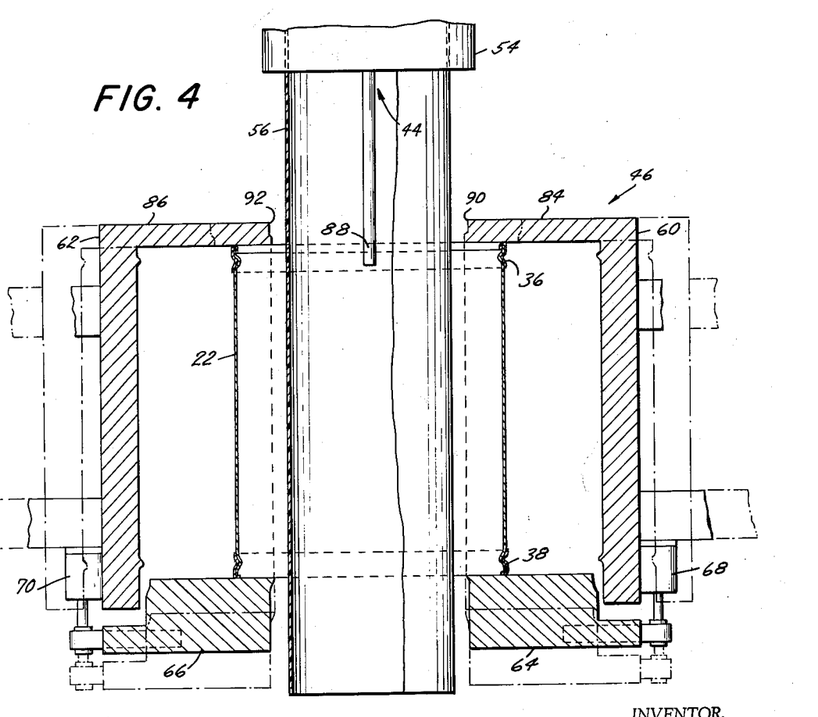
FIG. 4 is an enlarged schematic and diagrammatic sectional view of this press showing the movable die faces which cooperate in confining the outer fiber shell, with dies at each end thereof for effectively blow-molding the extruded parison within the shell.
Figure 5:
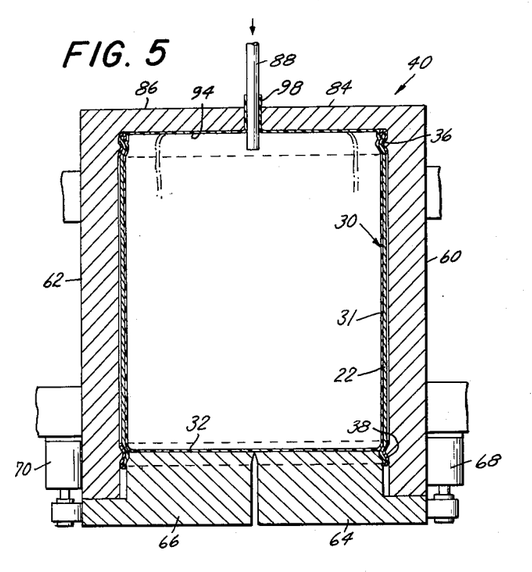
FIG. 5 is a similar sectional view with the die faces closed and lower terminal end of the parison closed thereby and the upper end of the length of extruded tubing severed from the remainder of the parison so that the liner may then be blown to assume the position illustrated in solid lines from its initial position as represented in phantom.

Referring now to FIGS. 4 and 5 in particular, it will be noted that the press 46 includes a pair of opposed drum dies 60 and 62 each of which are adapted to be hydraulically actuated from the open position illustrated in FIG. 4 to the closed position of FIG. 5. In addition, the press includes a pair of bottom dies 64 and 66 which are adapted to shift upwardly from their lower position of FIG. 4 to their elevated position of FIG. 5 through the operation of the respective hydraulic piston and cylinder assemblies 68 and 70. Substantially simultaneously with the raising of these bottom dies the drum dies 60 and 62 serve to force the bottom dies 64 and 66 inwardly to the position illustrated in FIG. 5.

As stated in the foregoing, our present invention contemplates the examination of the tops and bottoms of the plastic liner 32 in order to be assured of its continuity and freedom from any zones of weakness, pin holes or the like. To this end, in forming the chime reinforced drums 20, the chime strips 36 and 38 are initially placed around the fiber shell 22 prior to the blowing cycle. In this connection, the upper chime strip 36 is initially fitted tightly around the shell 22 and extends from a spaced distance below the upper end upwardly and overlaps the top and at the same time projects downwardly for a short distance into the interior of the shell as shown most clearly in FIG. 7. A short distance from the upper end of the shell 22 the fiber body and the metal reinforcing chime 36 are deformed inwardly so as to provide an external groove 74 and internal shoulder 76.

Similarly, the bottom reinforcing chime 38 is initially placed tightly around the lower end of the shell 22, but merely overlaps the bottom peripheral edge thereof. The bottom chime strip 38 and fiber body are then deformed to provide the external groove 78 and internal shoulder 80. The foregoing association of the chime strips 36 and 38, with the fiber shell 22, is more fully disclosed in our prior Patent No. 2,884,176 granted April 28, 1959.

Figure 8:
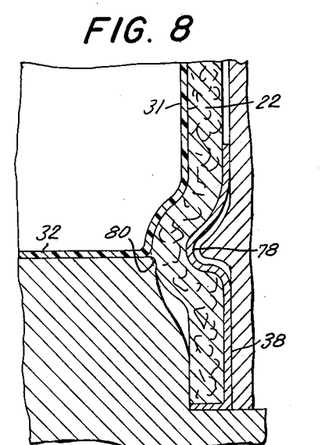
FIG. 8 is similarly an enlarged fragmentary sectional view of the bottom of the fiber shell and blown plastic lining with the press in a closed position.

The die cavity provided by the drum dies 60 and 62, as well as the bottom dies 64 and 66, are correspondingly contoured for neatly receiving the external grooves and internal shoulders formed in the fiber shell 22 and the reinforcing chimes 36 and 38. In this connection, the upper circumferentially extending peripheral edge of the bottom dies 64 and 66 may be disposed at a somewhat increased radius so that when forced upwardly to their elevated position, the crest of the internal shoulder 80 will be deformed in order to provide a slight radius of curvature and thereby eliminate a sharp corner in the eventually formed plastic lining as will be appreciated by the showing of FIG. 8.

Suitable air and vapor exhaust ports may be provided in the dies of the press between the die cavities and the external face of the fiber shell 22, as well as between the inner face of the fiber shell 22 and the exterior of the liner 31, for purposes of eliminating any undesirable air or vapor pockets when the die faces are closed, and the sealed length of parison blown into its expanded condition.

The fiber shell 22 with its tightly fitting upper and lower reinforcing chimes 36 and 38 is mounted in the fully opened platen press 46 either manually or automatically by suitable conveying and feeding means. Subsequent to the discharge of a predetermined length of molten thermoplastic parison 56 which is preferably in tubular form having in the present embodiment a substantially circular cross-section, die press 46 is closed. The top die sections 84 and 86 of the respective drum side wall dies 60 and 62 are accordingly shifted towards one another to pinch the plastic parison 56 and at the same time provide access therethrough at their juncture for an air blowing tube 88 of the employed blowing equipment 44. It should be fully understood at this time that the juncture of the top die sections 84 and 86 may also include mechanism for forming one or more bung holes. Under these circumstances, the faces 90 and 92 of the upper die sections 84 and 86, respectively, may in themselves be employed as die cavities.

Upon the closing of the upper die sections 84 and 86 it naturally follows that the drum side wall dies 60 and 62 will embrace the exterior of the fiber shell 22.

Substantially simultaneously with the operation the bottom dies 64 and 66 will close by traveling radially inwardly along with the drum side wall dies 60 and 62 to pinch and, at the same time, seal the parison 56 a short distance above its lower terminal end. Immediately thereafter, the hydraulic piston and cylinder assembly 68 and 70 will elevate the bottom die sections 64 and 66 as a unit into the fiber shell 22 against the internal lower shoulder 80 while carrying therewith the associated sections of the parison 56.

In order to minimize wrinkling or crimping, and consequently the creation of zones of weakness in the pinched length parison 56, air under pressure may be introduced to the interior of the parison through the air pipe 88 as the press 46 closes. This introduction of air under pressure can, quite obviously, be automatically initiated through the actuation of suitable switching means. The pinched length of parison, while still in a somewhat molten condition, will be blown and consequently expanded into engagement with the cavities provided by the die faces of the press 46 as illustrated in FIG. 5. Thus, a liner 31 is formed having an upper liner section 94 conforming with the internal face of the upper die sections 84 and 86 and a liner base conforming with the inner face of the bottom dies 64 and 66. Liner side walls 31 follow the contours of the fiber shell 22 starting from a location substantially opposed to the crest of the lower internal shoulder 80 to the upper edges of the upper chime strip 36.

Figure 6:
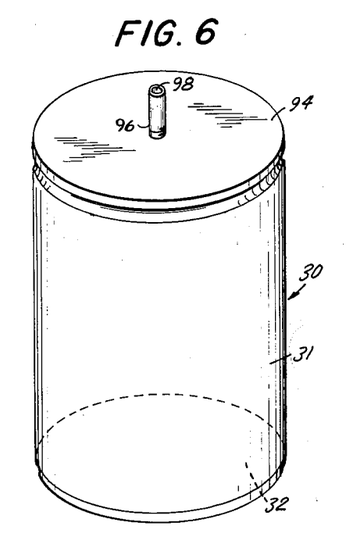
FIG. 6 is a perspective view of the blown liner segregated from the press and confining outer fiber shell.

In order to expedite the cooling and setting of the blown thermoplastic material, the die faces of the press 46 are water cooled in accordance with usual practice or refrigerated in a known manner. The press 46 is then opened to retract its die faces and permit the withdrawal or removal of the lined fiber shell 22. The approximate configuration of the blown liner is illustrated in FIG. 6 as it would appear disassociated from the surrounding shell. As will be noted, a manifold 96 extends upwardly from the exterior of the upper liner section 94 and may be easily removed by any trimming or severing operation. The configuration of the manifold 96 results from the construction of the die faces 90 and 92; and that in this connection may provide, in addition to the opening 98 created by the air pipe 88, an externally threaded filling and emptying fitting shown on the present embodiment for illustrative purposes only. In this connection, if the top liner section 94 is to be retained to conform to the selected closure, the fitting would project therethrough and conveniently receive an internally threaded cap in a manner which will become evident incident to the teachings of the embodiment shown in FIGS. 13 and 14.

Another fiber shell 22, with upper and lower chime strips 36 and 38 as illustrated in FIG. 4, may be placed in the open press 46 to initiate another cycle by which a blown plastic liner is produced in accordance with the foregoing manufacturing steps. It should be understood that the timing of the cycle and sequence of operation permit the insertion and withdrawal of the fiber shell 22, efficient closing and opening of the press 46 and at the same time, continuous extrusion of the parison 56.

In accordance with a commercial application of our invention the press 46 was preset to exert pressures upwardly of 20 tons. The thermoplastic parison was extruded at temperatures of about 350° F., while the extruder 40 induced pressures on the hot melt between 3 to 5000 p.s.i. The thickness of the liners were controlled and ranged between 5 mils and 30 mils.

With respect to the parameters of the parison, it should be realized initially that the selected thermoplastic material should be capable of being blown. The molecular structure of the plastic will naturally determine the amount of stretching of the parison incident to blowing. In expanding the parison into the desired liner, the elastic limit of the material should not be exceeded, bearing in mind that the air pressure acts uniformly on and normal to the liner walls and that certain sections of the liner will be expanded more than others because of the contours of the die cavities of the press. The thickness of the extruded parison should be small enough to permit expansion and large enough to avoid creation of zones of weakness in the blown liner. Naturally, the diameter of the extruded parison must take into consideration the thickness thereof and vice versa in order to obtain the desired liner; and these two parameters will in effect balance one another and become readily calculable within a short period of time after practicing our invention. Under the circumstances, the thickness of the plastic liner can be varied according to the requirements.

We have found, that due to the molten condition of the parison as it is blown, the thermoplastic material permeates and penetrates the kraft of the shell; and there is noticeable adherence between the liner and the shell. Our process can be regulated whereby the degree of adhesion between the liner and shell can be controlled to best suit the requirements for which the package is made. In this connection, the variable that should be considered are the temperature and pressure at which the liner is blown and the length of time in which the pressure is exerted. The thermoplastic material utilized and the condition of the kraft including its moisture content are other determining factors. It should be understood, the method of application can be such that the thermoplastic liner can be blown to the contour of the interior of the shell and not be secured thereto.

As will be appreciated by those skilled in the art, the upper liner section 94 and liner base 32 may now be examined for continuity, zones of weakness, pin holes and the like. At the same time, the integral juncture of the side walls 30 therewith may also be examined for any possible ruptures.

Figure 7:
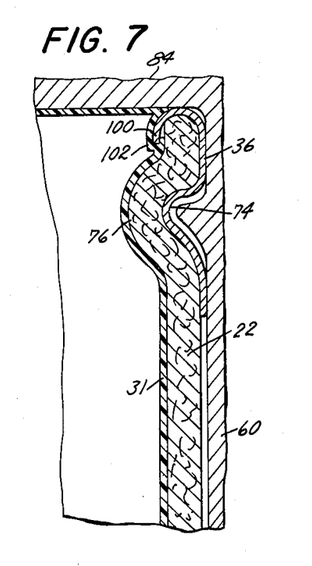
FIG. 7 is an enlarged fragmentary sectional view of the top of the fiber shell and blown plastic lining, while still in the closed press.

The top chime construction may now be completed. As stated in the foregoing, the upper chime strip 36 includes a downturned inner peripheral edge designated by numeral 100, which in the embodiment heretofore disclosed, is slightly spaced from associated surfaces of the upper end of the fiber shell 22. Accordingly, when the liner 31 is blown, thermoplastic material will be forced into the existing crevice between the chime and inner face of the shell as illustrated in FIG. 7. The upper liner section 94 may now be removed by trimming, either manually or automatically, radially inwardly from the inner peripheral end of the upper chime strip 36 along the zone 102.

Figure 9:
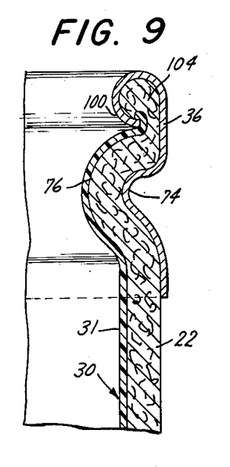
FIG. 9 is an enlarged fragmentary sectional view of the top of the finished lined drum having a metallic chime strip embracing a bead at the upper end of the shell and interlocked with the upper end of the liner.

A rounded bead 104 is then formed and with the same operation the inner periphery 100 of the upper chime strip 36 is curved downwardly and inwardly so as to encase and protect the bead 104. As will be clearly observed in FIG. 9, the upper end of the liner side wall 30 embraces the inner peripheral edge 100 of the chime strip and at the same time is embedded in the bead to provide an effective seal and prevent undesirable penetration of the contents of the ultimately formed fiber drum 20 through the fibrous side walls at this juncture. For details and acceptable technique for completed top chime construction reference is made to our United States Patent No. 2,884,176 granted April 28, 1959.

Figure 10:
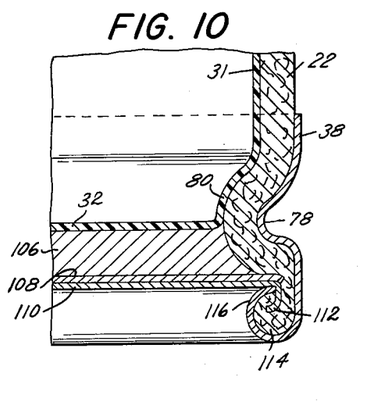
FIG. 10 is an enlarged fragmentary sectional view of the finished base of the drum having a metallic chime strip embracing a bead at the lower end of the shell which cooperates in anchoring the bottom closure for the drum juxtapositioned with the base of the blown plastic liner.

The bottom reinforcing chime construction may similarly be completed in accordance with the teachings of our patent mentioned immediately above. Thus, a cushioning bottom spacer 106 may be placed against the outer face of the liner base 32 and in engagement with the internal shoulder 80. An inner reinforcing fiber layer 108 may then be placed against the outer face of the spacer 106 and in turn may be covered by an outer fiber layer 110 of somewhat increased diameter having a laterally extending apron 112. The finished bottom chime construction will include the bead 114, encased and protected by the inner peripheral edge 116 of the bottom chime 38, which is pressed so as to be curved upwardly and inwardly. As illustrated, the inner and outer layers 108 and 110 will be firmly retained between the inner peripheral edge 116 of the bottom chime strip 38 and the internal shoulder 80 of the fiber shell 22. The apron 112 of the outer layer 110 will be interlocked within the bead 114 as shown in FIG. 10. The spacer, on the other hand, will be forced upwardly into tight engagement with surfaces of the internal shoulder 80.

Figure 11:
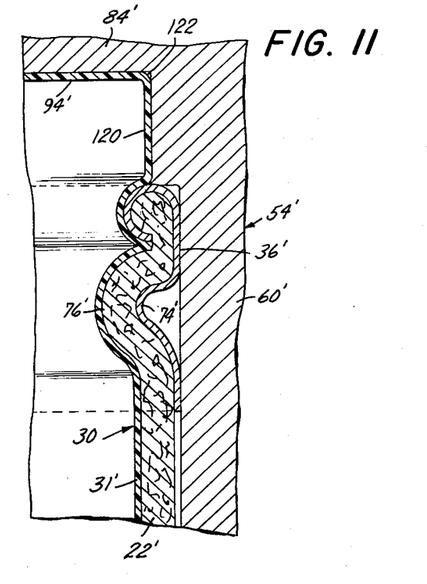
FIG. 11 is a fragmentary sectional view of a modification of the upper end of a finished drum while still in the press showing an upstanding plastic flange and the disposition of the blown liner in relationship to a pre-pressed upper bead and embracing metallic chime strip.
Figure 12:
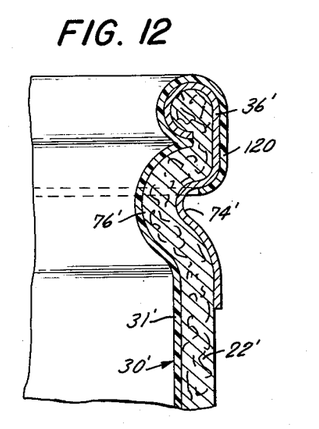
FIG. 12 is a fragmentary sectional view of the drum illustrated in FIG. 11 following trimming of the upper zone of the liner and folding the remaining liner strip over the outer face of the pre-pressed metallic chime strip.

In FIGS. 11 and 12 we disclose another form of top closure for our contemplated plastic lined fiber drums. In this embodiment, the top chime construction is completed prior to the introduction of the fiber shell 22' into the open press 54'. In this connection, reference should be made to our United States Patent No. 2,884,176 granted April 28, 1959, for further details of the chime formation. The drum side wall die as depicted by die 60' is extended beyond the uppermost edge of the chime strip 36' such that when the liner 31' is blown, a liner strip 120 is thereby formed. The liner 31 is then trimmed at the juncture 122 of the liner strip 120 and the top liner section 94' following the opening of the die faces of the press 54' and removal of the fiber shell 22' with contained liner 31'. The trimmed strip 120 is then folded over the top chime strip 36' as illustrated in FIG. 12 such that the terminal end of this strip is disposed in the internal groove 74. Thus, a protective liner is not only provided for the fibrous material at the upper end of the shell 22', but also for portions of the chime strip 36' that may come into contact with the contents of the finished drum.

Figures 13, 13A:
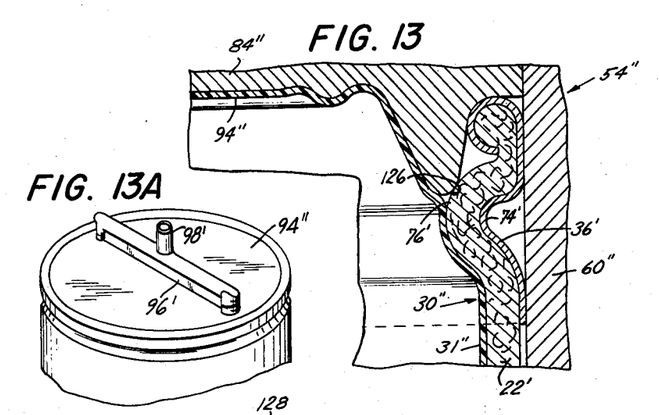
FIG. 13 is a fragmentary sectional view of a still further modification in the fabrication of the upper liner section such that upon blowing the section will assume the configuration of a cover to be eventually employed for closing the upper end of the finished drum and be formed as an integral continuation of the liner and at the same time have filler and vent openings and fittings.
FIG. 13A is a fragmentary perspective view of the head of the liner section showing the manifold having air conduits and which is severable to provide filling and vent fittings.
Figures 14, 14A:
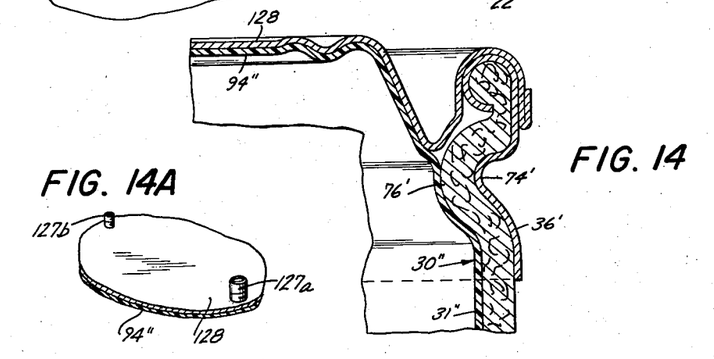
FIG. 14 is a fragmentary sectional view of this modified top closure with the finished fiber drum removed from the press showing the meshing relationship between the cover and the adjacent sectors of the blown plastic liner with the cover having suitable openings to receive the filler and vent openings and fittings of the plastic liner.
FIG. 14A is a fragmentary perspective view of the plastic head and cover showing the screw fittings for filling, emptying and venting projecting through suitable cover openings.

Referring now to FIGS. 13 and 14, a still further top closure is contemplated for our plastic lined fiber drum. In this embodiment, the top chime construction is also completed prior to the insertion of the shell 22' into the press 54". The press, however, will be provided with an upper die section as represented by section 84" having a configuration corresponding with that of the cover to be placed over the upper open end of the drum. In addition, the upper die face 84" will cooperate with the drum side wall die 60" in order to accommodate upper portions of the chime strip 36' so that a downwardly projecting peripheral edge 126 will engage the internal shoulder 76' of the fiber shell 22' upon closure of the press 54". When the liner 31" is blown it will assume the configuration or shape illustrated in FIG. 13. The fiber shell 22', with contained liner 31", is then removed from the press 54" and the intended cover 128 need only be slipped over the drum as shown in FIG. 14 and secured in place by means of a locking rim assembly 28 (see FIG. 1).

As shown in FIG. 13A the upper lower section 94" will be found with a manifold 96' resulting from the die cavity formed by the upper press face 84" and its mating press face. The air inlet passage 98' communicates with the interior of the liner through the branches of the manifold. The manifold is eventually trimmed and removed to provide the externally threaded filling fitting 127–a and vent fitting 127–b.

Figure 15:
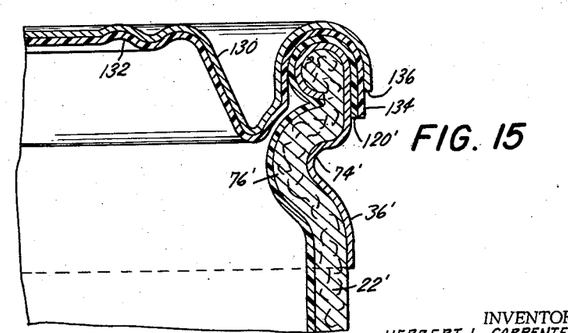
FIG. 15 is still another fragmentary sectional view of a further top closure in which a liner for the side walls of the fiber shell is formed similarly to that depicted in FIG. 12 with the upper sector of the liner being wrapped around a pre-pressed metallic chime strip and cooperating with a pre-formed plastic cover seal associated with a conforming cover with the two plastic members being heat-sealed at their terminal edges.

In FIG. 15 we disclose a modification of the plastic lined drum disclosed in conjunction with the embodiment of FIGS. 11 and 12. A trimmed strip 120' is folded over the chime strip 36', but terminates short of the external groove 74'. A cover 130, having a pre-formed cover seal 132 on its inner face, is adapted to effectively close the top of the drum. The seal 132, however, includes an integral strip 134 extending downwardly beyond the peripheral edge 136 of the cover 130 so that it may be heat sealed with the adjacent surfaces of the strip 120'. Thus, a further provision for a hermetically sealed plastic liner for a fiber drum is presented and when associated with a locking rim assembly 28 (see FIG. 1) optimum sealing of the top closure of the drum is possible.

Figure 16:
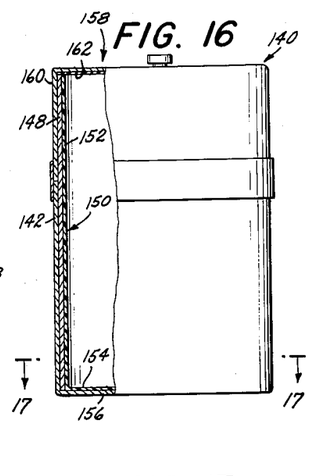
FIG. 16 is a side-elevational view with certain parts broken away and removed of another form of fiber drum having a blown plastic liner in accordance with the present invention, with the closure bearing a central filler and emptying aperture and cap therefor.
Figure 17:
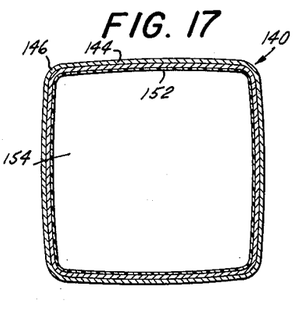
FIG. 17 is a cross-sectional view taken along the line 17—17 of FIG. 16 showing the drum as having transversely convex sides joined together by rounded corners.

It should be understood that we contemplate providing blown thermoplastic liners for drums having other forms of top and bottom closures, as well as cross-sectional shapes. With this in mind, attention is directed to FIGS. 16 and 17 wherein we disclose a fiber drum 140 having an outer shell 142 formed from laminated layers of fibrous material and having transversely convex sides 144 joined together by rounded corners 146. A correspondingly shaped fibrous liner 148 is disposed within the outer shell 142 and extends upwardly beyond the upper edge of the outer shell as shown. The drum 140 incorporates a thermoplastic liner 150 blown into engagement with the inner face of the fibrous liner 148 in accordance with the disclosed teachings of this invention. This plastic liner 150 includes side walls 152 covering substantially the entire inner surfaces of the fibrous liner 148 and also includes an integral base 154 extending laterally across the bottom of the drum. A suitable bottom closure 156 may provide the base of the drum, whereas the top closure 158 includes a downwardly extending apron 160 which is adapted to be telescopically disposed around the exposed sections of the fibrous liner 148. To complete the hermetic liquid seal at the top closure, a sheet of plastic sealing material 162 may be secured to the inner face of the top closure 158 as shown. To secure the top closure 158 to the outer shell 142 after the drum 140 has been filled with the desired liquid or semi-liquid substance, a sealing tape 164 may be placed over the junction of these drum parts. An externally threaded central filling and emptying fitting may be provided on the top closure 158 for receiving a cap. In the event, the integral top section of the liner is to be retained, an externally threaded manifold similar to that of FIG. 6 or 13A may be formed thereon to be eventually trimmed to project through an opening in the top closure as a fitting.

Where necessary, a flexible and compressible gasket may be used where plastic elements are not ordinarily heat-sealed together, as for example, at the juncture between liner 120 and seal 134. This would also apply in the case of the other embodiments contemplated and disclosed herein.

As will be apparent from the foregoing, bottom liner section is provided that is not attached to the fiber bottom closure. Accordingly, flexibility of the bottom liner section as provided under shock or impact, especially at the junction of the liner bottom section with the liner sidewalls. On the other hand, when deemed necessary or desirable an application of adhesive may be interposed between the plastic bottom section and bottom closure to form a unitary bottom construction of far greater strength.

It will thus be seen that the aforenoted objects and advantages are most effectively attained. It will also be realized that although specific embodiments of our invention have been described and illustrated, various changes therein will become evident to one skilled in the art. Therefore, our invention is to be determined by the scope of the appended claims.

We claim:

1. In the method of manufacturing plastic lined drums the steps of: initially forming a tubular shell having top and bottom open ends; confining said shell such that a passageway is provided into the shell interior; extruding a tubular plastic parison into said passageway; sealing the parison bottom end and top end while maintaining an air inlet opening exposed to the interior of the parison; introducing air under pressure through said air inlet opening into the interior of said parison to blow the parison outwardly and expand it into engagement with the interior of the shell; and then completing the bottom and top closures selected for said shell.

2. In the method of manufacturing plastic lined drums, the steps of: initially forming a tubular shell having top and bottom open ends; mounting said shell in an open press with the shell bottom end resting on a shiftable press face such that a passageway is present through the shell top and into the shell interior and out through the shell bottom end; extruding a tubular plastic parison into said passageway to a distance below the shell bottom end; closing said press to confine the side of said shell and substantially simultaneously seal the parison bottom end and close its top end with a retained air inlet opening; immediately thereafter actuating the shiftable press face such that it is disposed interiorly at a short distance from the bottom end of the shell; evacuating the press cavity between the press faces and the parison; and substantially simultaneously therewith introducing air under pressure through said air inlet opening into the interior of the parison to blow the parison outwardly and expand it into engagement with the interior walls of the shell and said shiftable press face while the upper end of said parison is confined by said press; withdrawing the shell and blown parison liner interiorly mounted therein from said press and then completing the selected bottom and top closures for the shell.

3. In the method of manufacturing plastic lined fiber drums, the steps of: initially forming a tubular shell made from laminated layers of fibrous material and having top and bottom open ends; mounting said shell in an open press with the shell bottom end resting on a shiftable press face such that a passageway is present through the shell top end into the shell interior and out through the shell bottom end; extruding a tubular plastic parison into said passageway to a distance below the shell bottom end; closing said press to confine the sides of said shell and substantially simultaneously seal the parison bottom and enclose its top end with a retained air inlet opening; immediately thereafter actuating the shiftable press face such that it is disposed inwardly of the shell at a predetermined distance from the bottom end of the shell; substantially simultaneously therewith introducing air under pressure through said air inlet opening into interior of the parison to blow the parison outwardly and expand it into engagement with the interior walls of the shell and said shiftable press face while the upper end of said parison is confined by said press; withdrawing the shell and blown parison liner interiorly mounted therein from said press; forming a bottom closure on said shell; and trimming the liner top to cooperate in forming the selected top closure.

4. In the method of manufacturing plastic lined fiber drums, the steps of: initially forming a tubular shell made from laminated layers of fibrous material and having top and bottom open ends, a lower reinforcing metal chime strip disposed around the shell at the bottom end thereof with the shell and lower chime strip being formed into an external groove and an internal shoulder extending completely around the drum a short distance from the lower peripheral edge of the bottom end thereof, an upper reinforcing metal chime strip disposed at the top around the shell end thereof with the shell and upper chime strip being formed into an external groove and an internal shoulder extending completely around the drum a short distance from the upper peripheral edge of the top end thereof; mounting said shell in an open press such that a passageway with the shell bottom end resting on a shiftable press face is present through the shell top end into the shell interior and out through the shell bottom end; extruding a tubular plastic parison into said passageway to a distance below the shell bottom end; closing said press to confine the sides of said shell and substantially simultaneously seal the parison bottom end and close its top end with a retained air inlet opening; immediately thereafter actuating the shiftable press face such that it engages the bottom internal bead of the shell; substantially simultaneously therewith introducing air under pressure through said air inlet opening into the interior of the parison to blow the parison outwardly and expand it into engagement with the interior walls of the shell and said shiftable press face while the upper end of said parison is confined by said press; withdrawing the shell and blown parison liner interiorly mounted therein from said press; determining the soundness of the top and bottom of the liner; forming a beaded bottom closure; and trimming the liner top to cooperate in forming the selected top closure.

5. The invention in accordance with claim 4 wherein upon withdrawal of the shell and blown parison liner from the press, the upper zones of the liner are trimmed proximate the periphery of the inner end of the upper chime strip; and the top end of the shell is pressed to form a circumferentially extending bead at its upper periphery embraced by the upper chime strip with the periphery of the inner edge thereof interlocking with the upper peripheral edge of the liner.

6. The invention in accordance with claim 4 wherein the upper zone of the blown plastic liner is pressed into a configuration corresponding with that of the cover to be applied across the upper end of the fiber shell and top of the drum; and then placing the cover over the upper end of the drum following the removal of the drum from the press.

7. The invention in accordance with claim 4 wherein upon withdrawal of the shell and the liner from the press, a bottom closure is placed across the bottom end of said shell adjacent the bottom of said liner; and the bottom end of the shell is then pressed into a bead embraced by the bottom chime strip with peripheral sections of said bottom closure being anchored in the bead, and with said bottom closure secured to the shell such that the base of the liner rests upon the bottom closure.

8. The invention in accordance with claim 4 wherein upon withdrawal of the shell and blown liner from the press, the upper zone of the liner is trimmed at a point spaced from the upper end of the shell; and the strip of liner beyond the upper end of the shell is then folded over the outer face of the upper chime strip.

9. The invention in accordance with claim 8 wherein a steel cover is placed across the upper open end of the drum and has a preformed plastic sheet conforming to and attached to the inner face of the cover; and heat-sealing the sheet of the cover and the blown plastic liner together at their respective terminal edges.

References Cited in the file of this patent
UNITED STATES PATENTS

| | | |
|---|---|---|
| 1,993,751 | Reid | Mar. 12, 1935 |
| 2,335,913 | Buttery | Dec. 7, 1943 |
| 2,493,337 | Buttery | Jan. 3, 1950 |
| 2,727,673 | Bergstrom | Dec. 20, 1955 |
| 2,799,211 | Zerlin et al. | July 16, 1957 |
| 2,864,286 | Ramson et al. | Dec. 16, 1958 |
| 2,898,972 | Strong | Aug. 11, 1959 |
| 2,958,266 | Wilson | Nov. 1, 1960 |